(No Model.)
O. P. PRESCOTT.
CARPET SWEEPER.
No. 371,519. Patented Oct. 11, 1887.
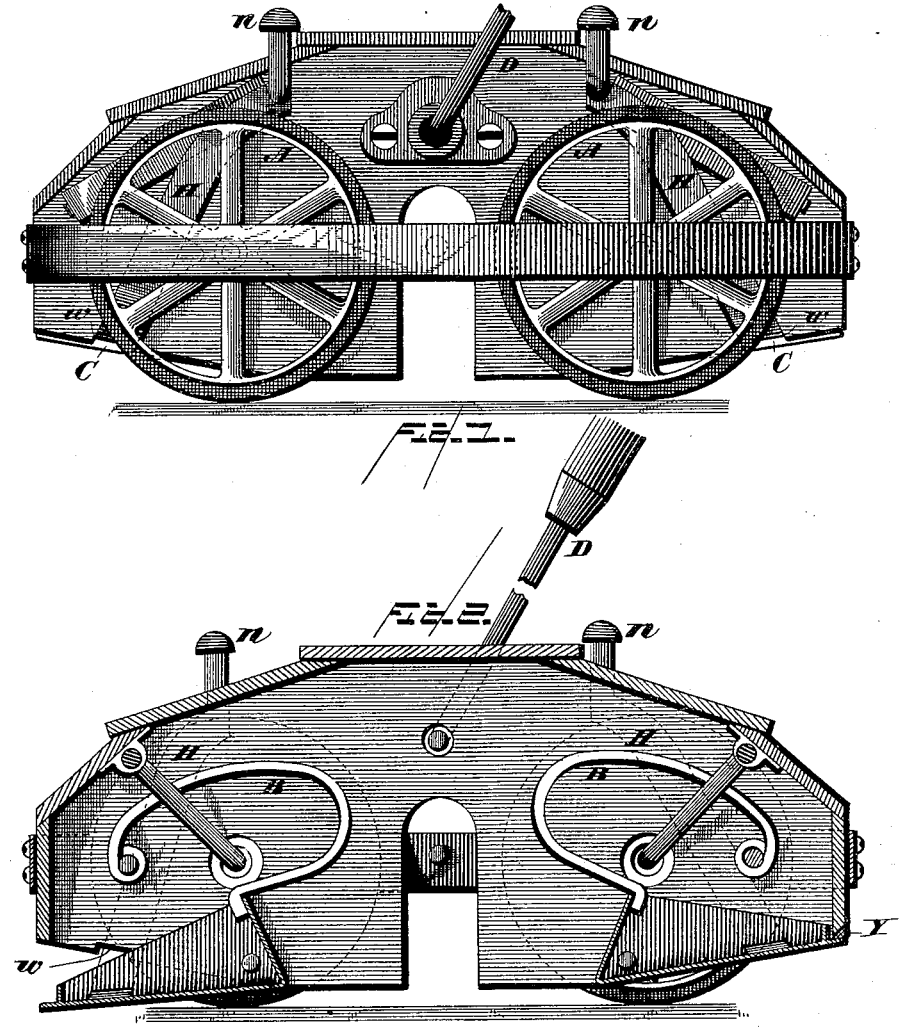
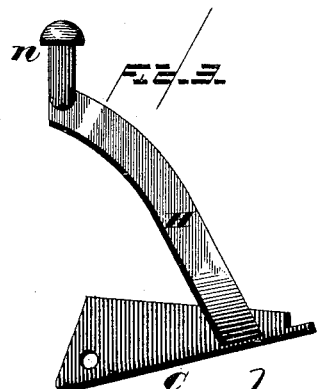
WITNESSES
INVENTOR
Oliver P. Prescott
by Smith & Sheehy
Attorneys

United States Patent Office.

OLIVER P. PRESCOTT, OF BOSTON, MASSACHUSETTS.

CARPET-SWEEPER.

SPECIFICATION forming part of Letters Patent No. 371,519, dated October 11, 1887.

Application filed June 11, 1887. Serial No. 240,980. (No model.)

*To all whom it may concern:*

Be it known that I, OLIVER P. PRESCOTT, a citizen of the United States, residing at Boston, in the county of Suffolk and State of Massachusetts, have invented certain new and useful Improvements in Carpet-Sweepers; and I do declare the following to be a full, clear, and exact description of the invention, such as will enable others skilled in the art to which it appertains to make and use the same.

My invention relates to an improvement in carpet-sweepers; and it consists in the novel means herein shown and described and claimed for operating the dust-pans of such sweepers.

The carpet-sweeper is constructed in the usual manner, consisting of the case, drive-wheels, dust-pans, and operating bail and handle.

The invention consists of the details of construction hereinafter fully described, and pointed out in the claim.

In the accompanying drawings, Figure 1 represents an end view of the sweeper; Fig. 2, an inside transverse section; Fig. 3, a section of the dust-pan with the lever.

In the drawings, H is the bent lever, which may be made of any suitable material, and is connected rigidly with the dust-pan, as shown in Fig. 3, and extending upward along the outside of the end wall and above the top of the sweeper-case, as shown in Fig. 1.

B is a spring, one end of which is pivoted to the inside of the end wall of the sweeper-case and the other end to the dust-pan, and bent in such a manner as to hold the dust-pan normally closed.

My device is operated by pushing the bent lever down sidewise with the hand along the end wall of the casing, which movement serves to overcome the action of the spring B and opens the dust-pan to the desired position and the dust is removed. The spring B will close the pan and hold it tightly in position when the pressure is removed from the lever.

I am aware that various lever devices pivoted to the dust-pan and combined with springs are common; but my invention differs materially from them.

What I claim as my invention, and desire to secure by Letters Patent, is—

The combination, with the sweeper case, of the pans pivoted therein, the spring bearing on the pans in rear of their pivotal points, so as to keep them normally closed, and the bent levers secured to the pans in advance of the said pivots, the said levers being carried along the outer ends of the case and upwardly, where they terminate in handles, substantially as specified.

In testimony whereof I affix my signature in presence of two witnesses.

OLIVER P. PRESCOTT.

Witnesses:
ANNIE M. COGHLAN,
EDWARD J. JONES.